United States Patent [19]

Smith

[11] 4,292,588

[45] Sep. 29, 1981

[54] ELECTROMAGNETIC INSPECTION TOOL FOR FERROMAGNETIC CASINGS

[75] Inventor: Glenn S. Smith, Houston, Tex.

[73] Assignee: Schlumberger Technology Corporation, Houston, Tex.

[21] Appl. No.: 970,671

[22] Filed: Dec. 18, 1978

[51] Int. Cl.³ .................... G01N 27/72; G01N 27/82; G01R 33/12

[52] U.S. Cl. .................................. 324/221; 324/225; 324/229; 324/243

[58] Field of Search ............... 324/219, 220, 221, 225, 324/226, 227, 228, 229, 234, 235, 236, 243

[56] References Cited

U.S. PATENT DOCUMENTS 2,992,390  7/1961  DeWitte .............................. 324/220
3,417,325  12/1968  McCullough et al. ............. 324/221

OTHER PUBLICATIONS

Wilson et al., "Development of Techniques for Improving Downhole Inspection of Steel Pipe Casing", Nov. 1977, Report to Pipeline Research Committee of the Amer. Gas Assoc.

*Primary Examiner*—Gerard R. Strecker
*Assistant Examiner*—Walter E. Snow

[57] ABSTRACT

An electromagnetic thickness tool is disclosed to produce a measurement of the wall-thickness of a ferromagnetic casing corrected for the effects of casing permeability. First apparatus provides an uncorrected thickness signal proportional to the thickness of the casing uncorrected for the effects of casing permeability. A second apparatus provides a permeability signal representative of the permeability of the casing. A signal processor uses the mathematical square root of the permeability signal as a correction factor for the uncorrected thickness signal for generating the corrected value. The second apparatus, responsive to a signal proportional to the magnitude of the inside diameter of the casing, corrects the permeability signal for the effects of casing inside diameter.

22 Claims, 7 Drawing Figures

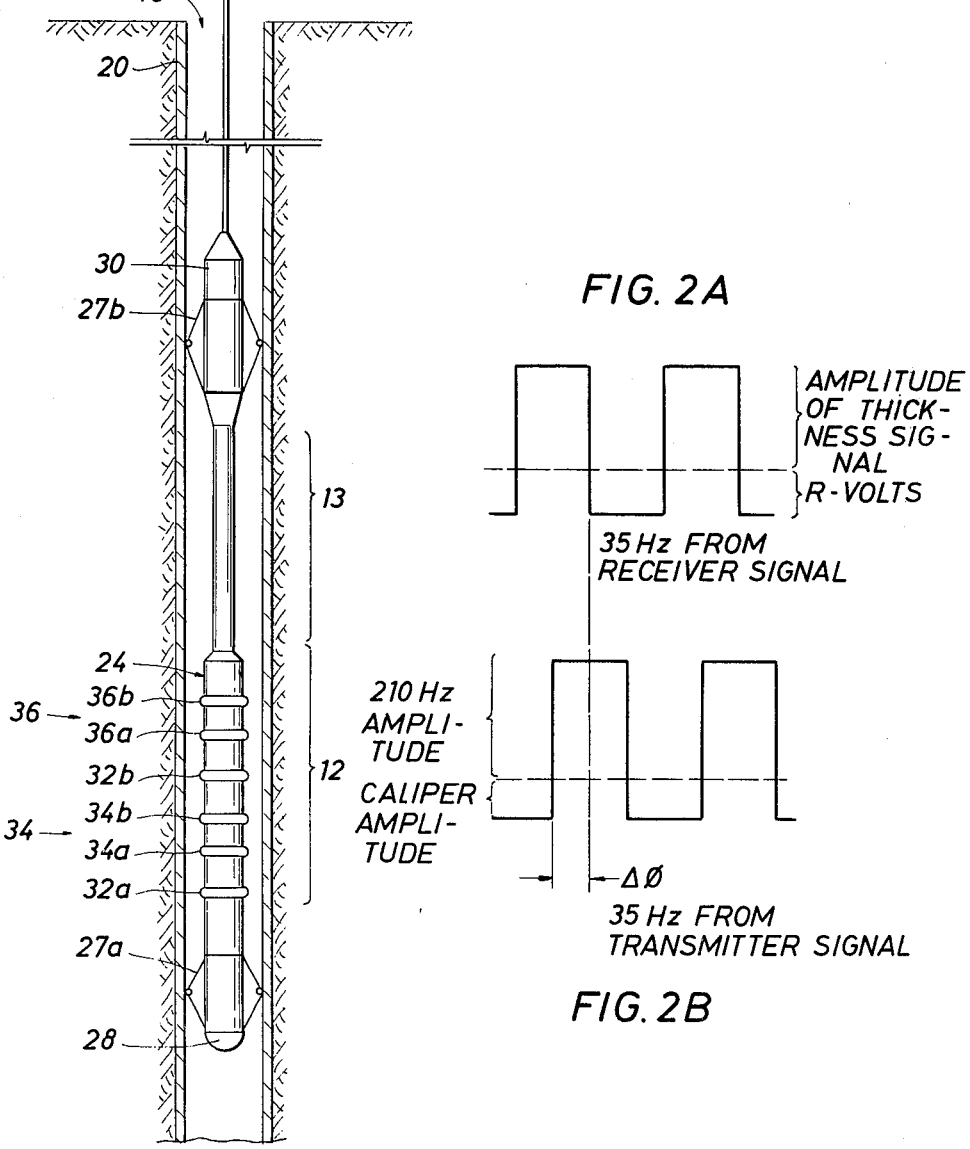

ELECTROMAGNETIC INSPECTION TOOL FOR FERROMAGNETIC CASINGS

BACKGROUND OF THE INVENTION

The present invention relates generally to electromagnetic inspection tools, and more specifically relates to tools employing eddy-current techniques for determining the wallthickness of ferromagnetic casing.

Tools for electromagnetically determining the wallthickness of casings are known in the prior art. These tools commonly use eddy-current or flux leakage principles.

Eddy-current Electromagnetic Thickness Tools (ETT) for measuring casing thickness use a transmitter coil spaced from a receiver coil for a measurement within the casing for applications where it is impossible to gain access to the outside of the casing, e.g., the casing of an oil or gas well. The transmitter coil is energized at a frequency and is spaced from a receiver coil such that flux which is generated is detected by the receiver coil after the flux has passed twice through the wall of the casing.

As the magnetic flux passes through the casing wall, circular eddy currents are generated in the casing. The circulating eddy currents cause the phase of the transmitted flux to change by one radian each time the flux passes through a so-called skin depth. By measuring the magnitude of the phase change between the transmitted signal and the received signal, an approximation to the thickness of the casing layer can be determined as a function of the conductivity and permeability of the casing and the frequency of the signal which energizes the transmitter coil. Typically, however, recordings as a function of depth of the well or "logs" of the phase change measurements are made and compared with a base or reference log previously made for a casing. Comparison of the base log with the logs created during measurements made on the casing under inspection allows a general determination of change of thickness of the casing.

As indicated above, one of the primary applications for ETT tools is in determining the wall-thicknesses of pipe casings. As oil becomes increasingly valuable, more accurate and precise determinations of the wall-thickness of oil field casings are required. For example, it is very important to be able to determine when pits and other imperfections reduce the wall-thickness to a dangerously thin value which could either allow contaminants into the casing or oil to leak from the casing. The latter concern is especially important from both ecological and economic standpoints in not polluting underground environments. For example, oil leakage into fresh water aquifiers in desert areas may have a devastating impact.

It is recognized that the measurements made by existing ETT tools are sensitive to magnetic anomalies in the casing being measured. Present day ETT tools also are dependent on conductive anomalies in the casing, but fluctuations in permeability are far more influential on the wall-thickness measurement than are fluctuations in the conductivity. That is, permeability variations are more likely to occur more frequently and over a greater range of values than are changes in conductivity. Accordingly, if an ETT tool is to achieve a reasonably precise determination of thickness, it must at least take into account the actual permeability value of the casing under inspection.

Prior art proposals for taking permeability into account in determining casing thickness appear either to be economically unattractive or technically insufficient. For example, there have been ETT tool proposals for measuring casing thickness using coils which produce flux at three different frequencies. The proposals have suggested that this data be compared or otherwise processed to produce a more precise determination of casing thickness. The use of digital computer techniques employing predictive formulas and iterative techniques for analyzing the data taken at three separate frequencies has been suggested.

One prior art proposal has suggested monitoring a permeability signal simultaneously with a thickness signal to recognize permeability effects on the thickness signal. These proposals have not culminated in a commercially satisfactory solution to the need for a more precise Electromagnetic Thickness Tool (ETT) for measuring the thicknesses of ferromagnetic casings.

An important shortcoming of prior ETT tools is the fact that the phase shift measurement, while proportional to casing thickness, is also dependent on casing permeability. As indicated above, a base log must have been run for a particular casing, and the ETT log for the casing under inspection had to be compared to the base log in order to obtain an indication of a change in casing thickness. This technique has not only been cumbersome, but has given values only generally representative of wall-thickness.

SUMMARY OF THE INVENTION

The electromagnetic thickness tool according to the invention overcomes the shortcomings of prior casing thickness measurement tools by providing compensation to the thickness measurement for the effects of permeability and inside diameter parameters of the casing under inspection, thereby providing increased accuracy in the thickness measurements. The invention provides a tool which is commercially attractive because of its simplicity and reliability, and because of a design especially adapted for field use applications. The invention eliminates the need for comparing logs with a previously made base log; instead, it allows a single log to indicate directly the true wall-thickness of the casing under inspection.

According to the invention, the electromagnetic thickness tool includes a first apparatus which is adapted to be positioned within the casing under inspection for generating an uncorrected thickness signal. The uncorrected thickness signal is proportional to the wall-thickness of the casing uncorrected for the effects of casing permeability. Second apparatus is provided for generating a permeability signal representative of the permeability of the casing. A signal processor, responsive to the permeability signal and to the uncorrected thickness signal, generates a corrected thickness signal having a value of wallthickness compensated for the effects of the permeability. The signal processor includes a circuit for generating a signal proportional to the square root of the permeability signal, and for dividing the amplitude of the uncorrected thickness signal by the square root of the permeability signal.

According to another feature of the invention, the electromagnetic thickness tool also comprises a third apparatus for generating a caliper signal proportional to the inside diameter of the casing. A circuit responsive to the caliper signal is provided for correcting the permeability signal for the effects of the inside diameter of the casing.

The apparatus of the invention preferably further includes a memory programmed to have stored therein data representative of the permeability of casing having at least one specified inside diameter. If only a single inside diameter specification is programmed into the memory, the second apparatus includes a circuit for biasing the caliper signal to a value effectively corresponding to the inside diameter value programmed into the memory.

The first, second and third apparatus include first, second and third sets of transmitter/receiver coils spaced coaxially along the axis of the casing. The first set of coils, or thickness coils, includes a transmitter coil which is energized at a relatively low frequency for inducing eddy currents in the casing. A receiver coil detects and responds to the induced eddy currents. The eddy currents cause a phase shift between the signal detected by the receiver coil and the signal which energizes the transmitter coil, the phase shift being a function of the thickness of the casing and the permeability thereof.

The second set of coils, or permeability coils, is positioned at locations between the thickness coils. The transmitter coil of this set is energized at a relatively higher frequency than the thickness measurement transmitter coil. Preferably this higher frequency of the permeability measurement is an integer multiple of the frequency used to energize the thickness coils. For a thickness coil energizing frequency of 35 Hz, a frequency of 210 Hz is preferred for energizing the permeability coils.

The third set of coils, or caliper coils, is disposed along the axis at spaced locations both to one side of and outside of the thickness coils. The caliper coils, connected by a ferrite core, are energized at a relatively high frequency such as 30 kHz.

According to another feature of the invention, all receiver coil readings are adjusted to a common reference point on the casing, providing increased precision of operation. Preferably, the reference point is intermediate the permeability coils.

Accordingly, it is a general object of the present invention to provide a new and improved electromagnetic thickness tool and method for determining the thickness of a casing with increased accuracy by accounting for the effects of casing permeability.

Other objects, features, and advantages of the invention will become apparent from the following detailed description of a preferred embodiment of the invention when read in conjunction with the accompanying drawings.

BRIEF DESCRIPTION OF THE DRAWINGS

FIG. 1a schematically illustrates an electromagnetic thickness tool according to the invention;

FIGS. 2a and 2b are illustrative telemetry signals which are transmitted to surface instrumentation.

DETAILED DESCRIPTION OF A PREFERRED EMBODIMENT

Figure 1B:
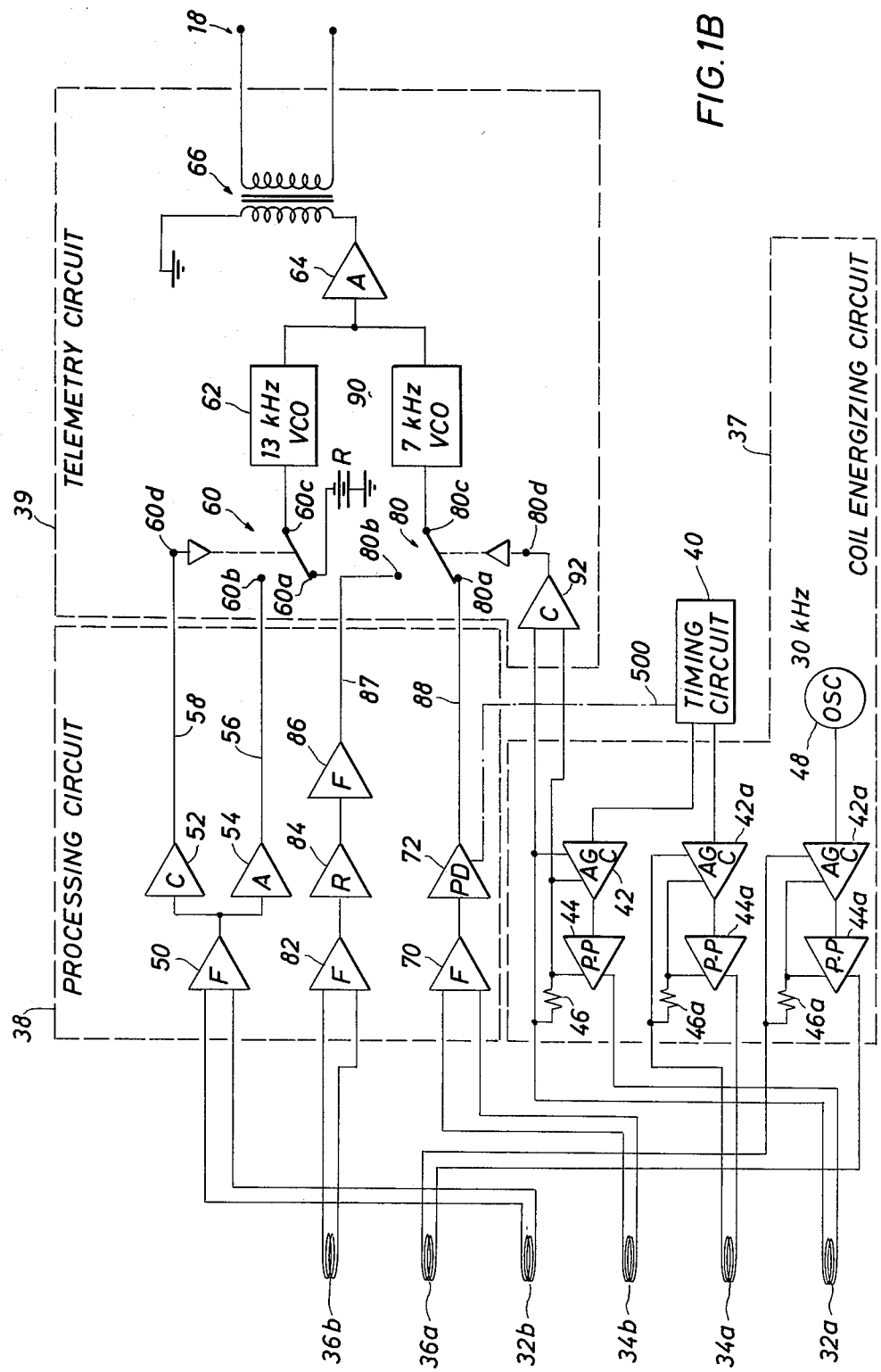
FIG. 1b illustrates the electrical circuitry of the down hole portion of the electromagnetic thickness tool.

An electromagnetic thickness tool 10 (hereafter also referred to as "ETT") constructed in accordance with the invention is schematically illustrated in FIG. 1. The tool 10 determines the wall-thickness of ferromagnetic oil and gas well casings in a manner which corrects for the effects of casing permeability on an eddy-current thickness measurement. As a further feature, the tool 10, when measuring the permeability for use in compensating the thickness measurement, also measures the inside diameter of the casing for compensating the detected value of permeability for the effects of casing inside diameter. The inside diameter of the casing is also valuable as an independent measurement.

The tool 10 includes a down hole sonde 12, down hole electronic cartridge 13, and surface equipment 14. The sonde 12 is adapted to be suspended in and movable through a well bore 16 by an armored cable, or wireline, 18. The well bore 16 includes a casing 20 having thickness which the tool 10 is designed to measure as a function of well depth as the tool is raised or lowered within the casing 20. The wireline or cable 18 may be single conductor (referred to as mono-cable) or multiconductor (which may be a heptacable when there are seven conductors). For measuring casing thickness according to the invention as described, mono-cable is preferred.

The surface equipment 14 communicates with the sonde 12 via the cable 18 for the purposes of controlling the position of the sonde 12 within the casing 20 and for receiving, processing, and displaying and recording signals transmitted down hole from the sonde 12.

A cable-following mechanical transducer 22 and linkage 23 provides position signals indicative of the depth of the sonde 12 in the well bore 16. Typically, the transducer 22 takes the form of a calibrated pressure wheel urged against the wireline 18 and generates electrical pulses as the wheel rotates due to travel of the sonde 12 within the casing.

The down hole tool comprises a sonde 12, an electronic cartridge section 13, a pair of centralizers 27a, 27b, a tip or nose member 28 and a cable head adapter 30. The down hole tool is connected to the cable 18 via the cable head adapter 30.

The sonde 12 contains sets of transmitter and receiver coils 32, 34, and 36 which are referred to as the thickness coils 32, the permeability coils 34, and the caliper coils 36. The thickness coils 32 are used to make electromagnetic measurements of the casing by measuring the amplitude and phase of the time rate of change of flux passing through the casing wall as a function of depth of the sonde 12 within the casing. These measurements are each proportional, in a different functional relationship, to the casing thickness uncompensated for casing permeability. The permeability coils 34 make electromagnetic measurements as a function of depth of the sonde 12 within the casing which are proportional to casing permeability uncompensated for casing inside diameter. The caliper coils 36 make electromagnetic measurements as a function of depth of the sonde in the casing and which are proportional to casing inside diameter.

The electronic cartridge section 13 of FIG. 1b houses a coil energizing circuit 37, a processing circuit 38, and a telemetry circuit 39. The coil energizing circuit 37 selectively energizes the transmitter coils 32a, 34a, and 36a to generate flux in a manner to be subsequently explained. The receiver coils 32b, 34b, and 36b detect time rate of change of flux from the respective transmitter coils and induce coil signals representative of the value of the detected flux. The processing circuit 38 is responsive to the coil signals from the respective receiver coils 32b, 34b, 36b and processes them to produce three signals: a signal proportional to the casing thickness uncorrected for casing permeability, a signal proportional to casing permeability uncorrected for casing inside diameter, and a signal proportional to the inside diameter of the casing. The telemetry circuit 39 transmits the processed signals via the cable 18 to the surface equipment 14 (see FIG. 1a) where they are further processed in accordance with the invention.

In more detail, as energized by the coil energizing circuit 37, the thickness receiver coil 32b detects the thickness receiver coil voltage which is primarily proportional to casing thickness but also is influenced by casing permeability. The permeability receiver coil 34b detects a voltage primarily proportional to casing permeability, but which is also influenced by the value of the inside diameter of the casing. The caliper receiver coil 36b detects a voltage proportional to the inside diameter of the casing.

The processing circuit 38 is responsive to the voltage at the output receiver coil 32b for generating an uncorrected thickness (phase) signal and an uncorrected thickness (amplitude) signal. In response to the permeability coil signal, the processing circuit 38 generates an uncorrected permeability signal. In response to the caliper coil signal, the processing circuit 38 generates a signal proportional to the inside diameter of the casing under inspection.

The received voltage by thickness receiver coil 32b has its amplitude and phase altered from that of the transmitter signal on thickness transmitter coil 32a by the action of the eddy currents flowing around the casing in response to the magnetic flux generated by coil 32a. The mathematical expression for the received voltage on receiver coil 32b is given by $$V_r = Ae^{-2X\sqrt{\pi\mu f\sigma}} \cdot e^{-j(2X\sqrt{\pi\mu f\sigma}+C)} \qquad (1)$$

The term, $Ae^{-2X\sqrt{\pi\mu f\sigma}}$, the amplitude of the received voltage decreases as a function of casing thickness X and skin depth $\delta = 1/\sqrt{\pi\mu f\sigma}$. The term, $e^{-j(2X\sqrt{\pi\mu f\sigma}+C)}$, the phase of the received voltage with respect to the transmitted signal, changes a function of thickness X and skin depth $\delta$.

The apparatus of this invention uses the receiver phase measurement to determine thickness of the casing under inspection. The amplitude of the receiver voltage is used to account for uncertainties in the phase shift measurement resulting when a phase shift greater than 360 degrees occurs.

As indicated above, the uncorrected thickness signal is obtained as a phase shift $\Delta\phi$ between the time rate of change of flux detected by the receiver coil 32b and the current generating the flux in transmitter coil 32a. The relationship between $\Delta\phi$ and physical parameters of the casing is expressed as $$\Delta\phi = 2X(\sqrt{\pi f\mu\sigma}) = K\sqrt{\mu} \qquad (2)$$

where X is casing thickness, f is the frequency of the transmitter coil 32a, $\mu$ is magnetic permeability of the casing under inspection, and $\sigma$ is casing conductivity.

The term, K, is a value which may be considered a constant in terms of f and $\sigma$.

The surface equipment 14 (FIG. 1a) adjusts the uncorrected permeability signal according to the value of the caliper signal to generate a corrected $\mu$ signal. Surface equipment 14 then generates a signal proportional to the mathematical square root of the corrected $\mu$ signal and divides the $\Delta\phi$ signal (the uncorrected thickness signal) by the $K\mu$ signal, thereby generating a corrected signal proportional to X, the casing thickness. Corrected casing thickness signals are then recorded as a function of depth by means of recorder 100.

In the preferred and illustrated embodiment of the invention, the coils 32, 34, 36 are coaxially disposed along the axis of the sonde 12, which is along the axis of the casing to be inspected because of the action of centralizers 27a, 27b. The thickness coils 32a, 32b are positioned at spaced locations along the coil housing axis as shown in FIG. 1. The permeability coils 34a, 34b are positioned at spaced locations between thickness coils 32a, 32b. As shown in FIG. 1a, preferably the caliper coils 36 are both disposed on the side of the permeability coils 34 opposite the nose member 28.

The thickness transmitter coil 32a is energized at a frequency of 35 Hz and is separated from the thickness receiver coil 32b such that flux generated by the coil 32a passes through the casing near the coil 32a and reenters the casing near the coil 32b. For a sonde 12 of 3.4 inches in diameter (hereinafter referred to as the small sonde) and a sonde 12 of 5.2 inches in diameter (hereinafter referred to as the large sonde), the spacing between the thickness coils 32, 32b is respectively 17.4 inches and 21.8 inches. Sondes of these diameters are especially adapted to accommodate 4½–7 inch and 7–9⅝ inch casings.

The permeability coils 34a, 34b are energized and spaced so that the flux detected by the coil 34b remains substantially within the casing wall between the coils 34a, 34b. With a transmitter coil 34a frequency of 210 Hertz, an 8 inch spacing is preferred for the small sonde and an 11 inch spacing is preferred for the large sonde.

As will subsequently be explained, the 210 Hz energizing frequency for the permeability measurement is preferred. The 210 Hz frequency is within a general range of acceptable frequencies which produce the necessary flux characteristics, and is an even integer multiple of the 35 Hz energizing frequency for the thickness transmitter coil 32a. Selection of the 210 Hz frequency simplifies the design of the coil energizing circuitry 37 shown in FIG. 1b.

The caliper coils 36 are energized at a high frequency and are placed at a short spacing from one another such that the flux detected by the caliper receiver coil 36b primarily follows a path from the caliper transmitter coil 36a along the inside "skin depth" of the casing. This high frequency energization and short spacing provides an effective arrangement for measuring the inside diameter of the casing. For a 30 kHz energizing frequency for the caliper coil 36a, spacings of 1½ and 5 inches are preferred for the small and large sondes. An axial ferrite core connecting the caliper coils 36a, 36b is preferably provided to decrease the reluctance of the high frequency flux circuit.

Coils 32, 34 and 36 are of conventional coaxial design.

The coil energizing circuit 37 of FIG. 1b is similar for each coil except that each coil is energized at a different frequency. Accordingly, only the excitation circuitry for the coil 32a will be described. The corresponding circuitry for the coils 34a, 36a is denoted in FIG. 1 with like numerals having the additional designation "a".

The energizing circuit 37 includes a timing circuit 40, an automatic gain control (AGC) circuit 42 and an amplifier 44 for energizing the thickness transmitter coil 32a. The timing circuit 40 generates 210 Hz and 35 Hz signals using conventional square wave oscillator circuits. A high frequency, stable oscillator is digitally divided until the 210 Hz and 35 Hz signals are derived.

The amplifier 44 (indicated in FIG. 1b as P—P) is preferably a push-pull amplifier having its input terminal connected to the output terminal of the AGC circuit 42 and having its output terminals connected across the series connection of the transmitter coil 32a and a resistor 46. The AGC circuit 42, of conventional design, couples the 35 Hz signal from the timing circuit 40 to the amplifier 44, maintaining a constant current into the coil 32a. Because the tool of this invention is used to measure casings of different inside diameters and types, loading changes on the transmitter coil 32a tend to cause changes in the drive current to the transmitter coil 32a. The AGC circuit 42 compensates for these loading changes. The resistor 46 provides feedback from the transmitter coil 32a to the AGC circuit 42 in order to maintain constant energizing current to the transmitter coil.

The AGC circuits 42a for the transmitter coils 34a, 36a respectively are coupled to the timing circuit 40 and to a 30 kHz oscillator 48, thereby allowing the transmitter coils 34a, 36a to be energized by signals having 210 Hz and 30 kHz frequencies under constant input drive conditions.

The processing circuit 38 includes a band pass filter amplifier 50, a comparator 52, and a logarithmic (log) amplifier 54. The filter amplifier 50 is characterized as having a high Q of approximately 20, resulting in a pass band of approximately 1.5 Hz. Amplifier 50 does not alter the phase of the thickness receiver voltage of coil 32a. The input of filter amplifier 50 is connected to the output of the thickness receiver coil 32b. The output of filter amplifier 50 is connected to amplifier 54 and to comparator 52.

The amplifier 54 is an 80 dB per volt logarithmic amplifier for generating a signal proportional to the logarithm of the amplitude of the uncorrected thickness signal. This signal, used in surface processing circuitry to eliminate uncertainties of the phase measurement at the 360 degree point, is transmitted to the telemetry circuit 39 via a lead 56.

The comparator 52 generates a square wave signal on lead 58 having zero crossings corresponding to the zero crossings of the voltage from the thickness receiver coil 32 via amplifier 50. As will be explained below, the zero crossing of the square wave on lead 58, will be compared with zero crossings of the transmitter reference signal in the surface signal processing circuits.

The telemetry circuit 39 includes a switch 60 having signal input terminals 60a, 60b, an output terminal 60c and a rate control terminal 60d. Switch 60 is preferably a FET single pole-double throw switch of conventional design. The rate control terminal is connected to lead 58 so that the signal on lead 58 controls the switching rate of the switch 60. The terminal 60b is connected to lead 56 so that the amplitude uncorrected thickness signal is one of the signals alternately passed through the switch 60. Terminal 60a is connected to a reference voltage R of approximately 1 volt.

As illustrated in FIG. 2a, switch 60 generates a modulated signal at terminal 60c, having an amplitude when connected to terminal 60a of the reference voltage R and when connected to terminal 60b the amplitude of the uncorrected thickness signal on lead 56. Because operation of switch 60 is controlled by the signal on lead 58, the phase of the modulated signal at terminal 60c has the same phase as that on lead 58, which is also the same phase of coil 32b voltage.

The telemetry circuit 39 also includes a voltage controlled oscillator (VCO) 62, a driver amplifier 64, and a transformer 66. The VCO 62 has a 13 kHz center frequency, and the modulated signal at the terminal 60c of switch 60 controls the VCO 62 to generate a frequency modulated (FM) combined thickness signal to the amplifier 64. The amplifier 64 passes the frequency modulated signal to transformer 66 for transmission to surface equipment 14 via wireline cable 18.

Processing circuit 38 further includes a filter amplifier 70 and peak detector 72. Filter amplifier 70 is a band pass filter amplifier centered around a 210 Hz frequency and is connected to the permeability receiver coil 34b. The output of the filter amplifier 70 is connected to the peak detector 72. The peak detector 72 is of a conventional sample and hold design, having a 210 Hz sampling rate. This sampling rate is controlled by the timing circuit 40, as indicated by dashed line 500 in FIG. 1b. Although other techniques, such as rectification and filtering, may be suitably employed, use of a peak detector is preferred because it provides increased response characteristics.

The peak detector 72 generates an uncorrected permeability signal having its output connected via lead 88 to the telemetry circuit 39.

The telemetry circuit 39 also includes a switch 80 having input terminals 80a, 80b, an output terminal 80c, and a rate control terminal 80d, in a configuration similar to the switch 60. Switch 80d is also a conventional FET switch. The terminal 80a is connected to the peak detector 72 via lead 88 for receiving the uncorrected permeability signal.

The processing circuit 38 also includes a filter amplifier 82, a rectifier 84, and a filter 86. The filter amplifier 82 is a band pass filter centered around the 30 kHz frequency which is used to energize the caliper transmitter coil 36a. The filter amplifier 82 has a Q of approximately 7 which defines a pass band of approximately 4 kHz.

The output of filter amplifier 82 is connected to rectifier 84 which in turn is connected to the filter 86. The output of filter 86, proportional to the inside diameter of the casing, generates the caliper signal and is connected via lead 87 to terminal 80b of the switch 80.

Telemetry circuit 39 includes a second voltage controlled oscillator (VCO) 90 and a comparator 92. The output terminal of the comparator 92 is connected to rate control terminal 80d of the switch 80, and the input terminals of the comparator 92 are connected in parallel across the feedback resistor 46 which is connected across the terminals of thickness transmitter coil 32a. Comparator 92 provides to switch 80 a stable reference signal at a 35 Hz frequency, corresponding exactly to the 35 Hz signal which energizes the thickness transmitter coil 32a.

Switch 80, driven at 35 Hz, is connected between terminals 80b and 80a. FIG. 2b illustrates the resulting waveform at terminal 80c of switch 80. When connected to terminal 80b via switch 80, terminal 80c is impressed with voltage level on lead 87 proportional to the caliper signal. When connected to terminal 80a via switch 80, terminal 80c is impressed with a voltage level on lead 88 proportional to the uncorrected permeability signal.

The waveform appearing at terminal 80c is illustrated in FIG. 2b. The frequency of the square wave appearing at terminal 60c (FIG. 2a) is 35 Hz, but having the phase of the received thickness coil 32b signal. The frequency of the square wave appearing at terminal 80c (FIG. 2b) is 35 Hz, but it has the phase of the transmitter thickness coil 32a signal. As explained below, surface processing circuitry detects the difference in phase between the two 35 Hz signals to generate a phase difference signal proportional to the uncorrected casing thickness.

The VCO 90 is connected to voltage signal terminal 80c for converting the modulated caliper voltage signal and uncorrected permeability signal voltages to modulated frequency signals. The VCO 90 has a center frequency of 7 kHz, so that the converted caliper frequency signal and converted uncorrected permeability frequency signal are centered around a frequency of 7 kHz. This modulated signal is amplified by amplifier 64 and impressed, along with the output from VCO 90 on the wireline cable 18 via transformer 66.

Figure 3:
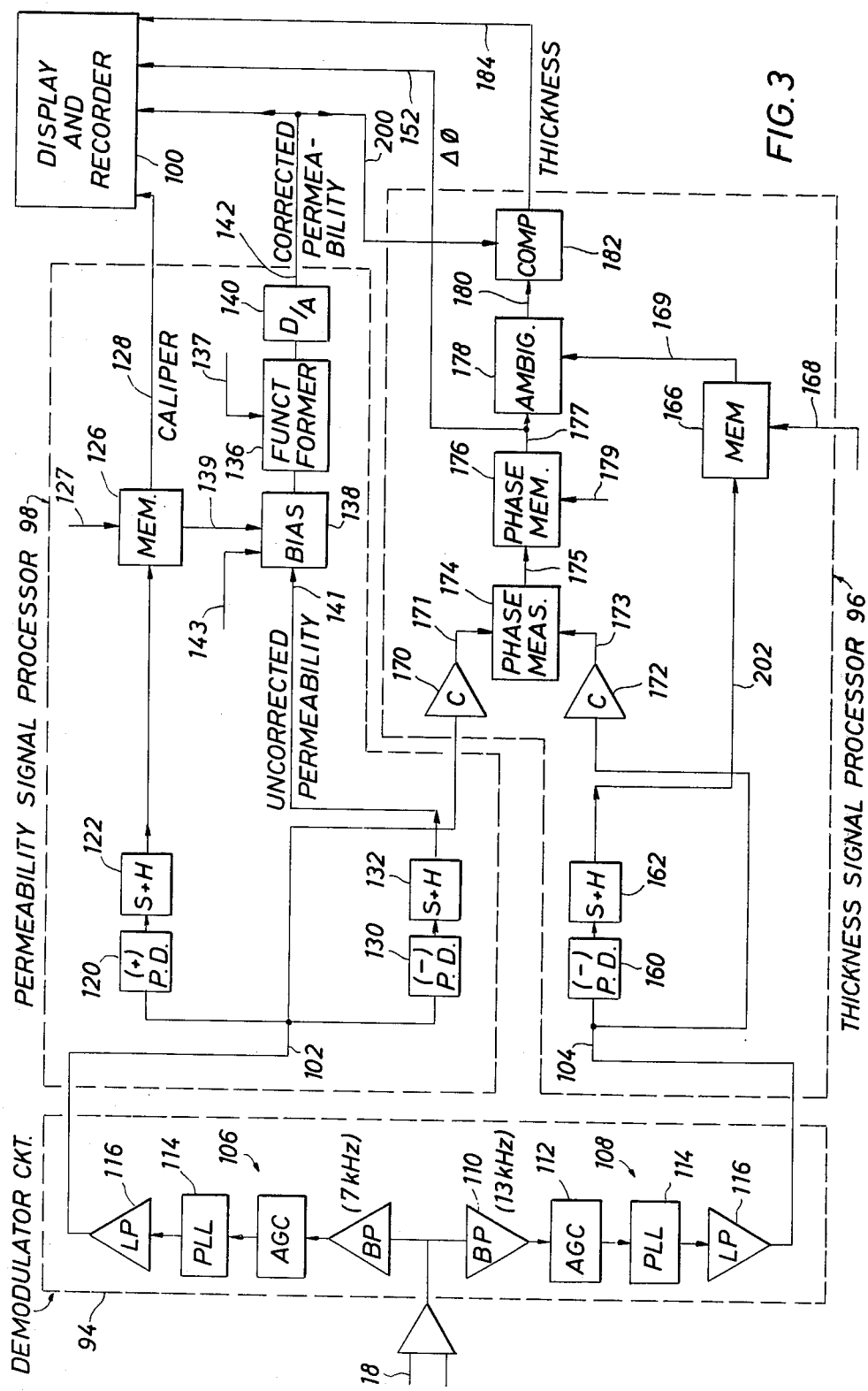
FIG. 3 schematically represents surface receiving circuitry and signal processing circuitry.

Surface processing equipment, illustrated in FIG. 3, includes a demodulator circuit 94, a thickness signal processor 96, a permeability signal processor 98, and a display and recorder apparatus 100. The display/recorder 100 is one conventionally known in the well logging art, such as those described in U.S. Pat. Nos. 2,623,083, 3,023,362, 3,449,755, 3,488,661 and 3,634,865 assigned to the assignee of the present invention. Demodulator circuit 94 is coupled to the wireline cable 18 for demodulating onto a pair of leads 102, 104 the modulated signals respectively produced by down hole switches 80, 60 discussed previously and illustrated in FIG. 2a and FIG. 2b. More specifically, demodulator circuit 94 recovers and reproduces onto the lead 102 the signal appearing on terminal 80c (FIG. 1b) as illustrated in FIG. 2b. Demodulator circuit 94 also recovers and reproduces onto the lead 104, the signal appearing on terminal 60c (FIG. 1b) as illustrated in FIG. 2a.

Demodulator circuit 94 includes a pair of demodulators 106, 108. The demodulators 106, 108 are similar in design except they are designed to be centered around a 7 kHz frequency and a 13 kHz frequency respectively. Only a single description of one of the demodulators 106, 108 follows; with the frequency distinction in mind, the description is common to both.

The demodulator 108 includes a bandpass filter 110 centered around the 13 kHz frequency. An automatic gain control circuit (AGC) 112 is connected to the output of the bandpass filter 110. Because the wireline cable 18 may typically be on the order of 30,000 feet or more in length, there can be considerable signal attenuation. The AGC circuit 112 compensates the signal for attenuation.

A phase lock loop (PLL) circuit 114 is connected to the output of the AGC circuit 112. The PLL 114 is centered around a 13 kHz frequency to produce a signal locked in phase with the 13 kHz signal transmitted on the cable 18. The PLL converts the frequency modulated signal to a voltage signal thereby replicating the respective square wave used to modulate the 7 kHz and 13 kHz VCO's 62 and 90 illustrated in FIG. 2b. A low pass filter 116, connected to the output of the PLL 114, acts both as a filter and inverter. The low pass filter 116 has an upper cutoff frequency of approximately 1 kHz. The square wave appearing at terminal 60c is replicated, but inverted, at lead 104.

Demodulator 106 operates in a manner similar to demodulator 108 to replicate (but invert) on lead 102 the signal appearing at terminal 80c as illustrated in FIG. 2b.

Permeability signal processor 98 includes a peak detector 120, a sample and hold circuit 122, and a memory 126. The peak detector 120 is connected to lead 102 for detecting the positive level of the inverted waveform illustrated in FIG. 2b. The sample and hold circuit 122 produces a signal proportional to the amplitude of the 30 kHz signal, the caliper signal. The caliper signal is applied to memory circuit 126 where it is stored.

Memory circuit 126 stores a sequence of the caliper signals and, as will be explained in more detail below, outputs a caliper signal correlated in depth with the permeability signal output of the system. All signals are offset when actually measured by a distance from a casing reference point. Preferably this common reference point is located at the center of the spacing between the permeability coils 34.

In practice, memory 126 is implemented using a shift register which sequentially stores values of the caliper signal. These values are read out of the memory 126 according to the occurrence of pulses on linkage 23. These pulses are generated by the cable following transducer 22 via the linkage 23 on lead 127 according to distance traveled by sonde 12.

The permeability signal processor 98 also includes a peak detector 130, a sample and hold circuit 132, a function forming circuit 136, a bias circuit 138, and a digital-to-analog converter 140. The peak detector 130 is connected to the lead 102 for detecting the negative level of the inverted waveform of the waveform illustrated in FIG. 2b. Because of a signal inversion at the filter 116, detection of the negative amplitude yields the uncorrected permeability signal. The sample and hold circuit 132 is connected to the output of the peak detector 130 and provides a DC signal proportional to the amplitude of the uncorrected permeability signal. The signal from sample and hold circuit 132 is applied to bias circuit 138 to scale it according to data stored in function former circuit 136. Bias circuit 138 is explained in more detail below.

Function former 136 has data stored in it which characterizes the relative permeability of a casing as a function of time rate of change of flux detected by the permeability receiver coil 34b (according to the amplitude of the uncorrected permeability signal) and as a function of the detected inside diameter value of the casing, (as indicated by the value of the adjusted caliper signal.) The data is stored, as shown graphically in FIG. 4, as receiver voltage of the permeability coils as a function of casing relative permeability and several detected inside diameter values for a given casing.

Figure 4:
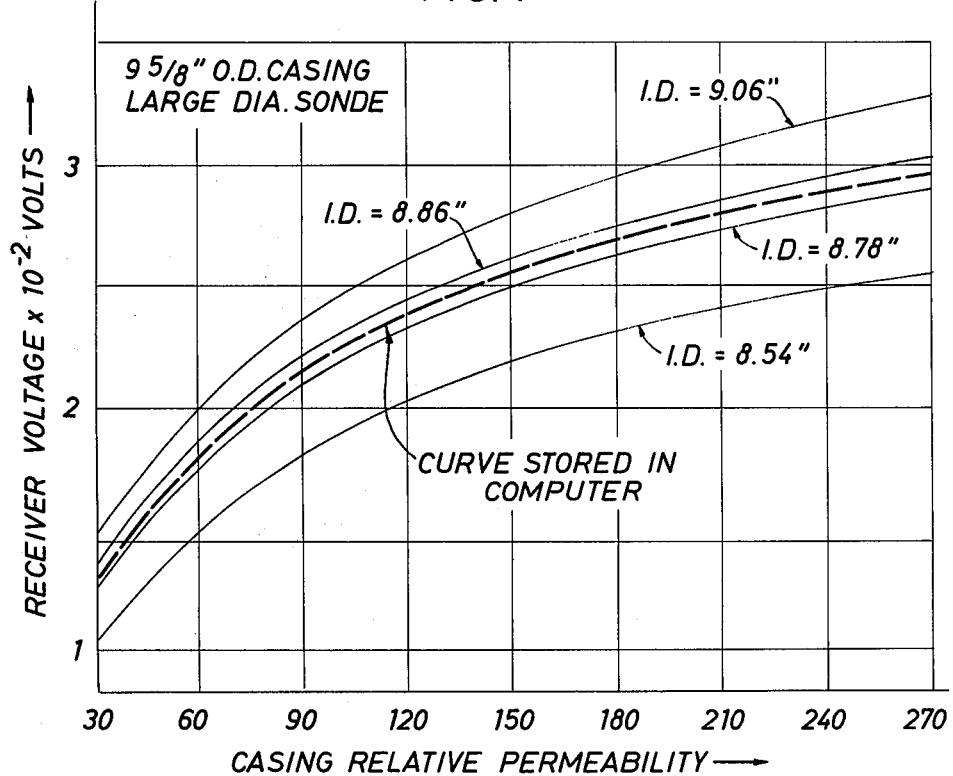
FIG. 4 is a graph of permeability receiver voltage as a function of permeability and inside diameter.

Function former circuit 136 is implemented using several read-only memories (ROMS), each having relative permeability curves as shown in FIG. 4 stored in tabular form corresponding to a casing of a nominal value. The selection of the particular ROM is via an input on lead 137 from a control panel (not shown). Upon selection of the proper ROM and in response to the caliper signal from the memory 126, and to the uncorrected permeability signal from sample and hold detector 132, function former 136 produces a digitally encoded signal which is representative of the permeability value of the casing under inspection, as corrected for the effects of casing inside diameter. The digital-to-analog converter 140 converts the digital output from function former circuit 136 to an analog value. This analog signal is hereafter referred to as being the corrected permeability signal and is output onto lead 142 and is also applied to thickness signal processor circuit 96 via lead 200.

In the preferred and illustrated embodiment, each ROM of the function former circuit 136 contains only a single curve of relative permeability versus voltage, corresponding to a single detected inside diameter value for a particular size of casing. The dashed curve of FIG. 4 indicates the stored curve in a ROM for a 9⅝ inch outside diameter casing. Other curves of inside diameter of FIG. 4 are approximated in the function former circuit by adding a voltage corresponding to the deviation of the measured inside diameter from the nominal inside diameter to the uncorrected receiver voltage. The bias circuit produces a voltage value equal to the uncorrected permeability receiver voltage plus the inside diameter deviation voltage. The output of the bias circuit is applied to the ROM function former 137 which outputs a signal representative of the corrected casing permeability.

Bias circuit 138 is connected to the memory 126 via lead 139 and to sample and hold circuit 132 via lead 141. Bias circuit 138 receives an input on a lead 143 from an operator control panel (not illustrated), specifying the constant by which the deviation of measured inside diameter from nominal must be multiplied to yield the inside diameter deviation voltage.

The thickness signal processor 96, responsive to the uncorrected thickness signal on lead 104 generates an adjusted, uncorrected thickness signal on lead 152. The thickness signal processor 96 includes a peak detector 160, a sample and hold circuit 162, and a memory 166. The peak detector 160 detects the negative levels of the waveform appearing on lead 104 which correspond to the inverted transmitted signal on lead 60c (FIG. 1b) as illustrated in FIG. 2a. Detection of the negative peaks yields the uncorrected amplitude thickness signal. The sample and hold circuit 162 is coupled to the output of the peak detector 160, generating a DC signal corresponding to the amplitude of the uncorrected thickness signal. A series of these amplitudes is stored in memory 166 as a function of the position of the thickness coils 32 with respect to the casing. Position information is input to the memory 166 via lead 168 from linkage 23 (see FIG. 1a) causing memory 166 to store uncorrected thickness (amplitude) signals corresponding to the casing reference point. The uncorrected thickness (amplitude) signal is output on lead 169 and represents the logarithm of the amplitude measured by the thickness receiver coil 32b (because of the action of the down hole amplifier 54 (FIG. 1a) as explained previously). The logarithm of the thickness receiver voltage yields a signal proportional to casing thickness (see equation 1, above).

The thickness signal processor 96 also includes circuitry for determining the phase difference between the signal on lead 102 (the inverted signal illustrated in FIG. 2b) and the signal on lead 104 (the inverted signal illustrated in FIG. 2a). The signal on lead 102 is the phase reference signal because it is derived from the current applied to thickness transmitter coil 32a (FIG. 1a). The signal on the lead 104 is shifted in phase from the reference signal because it is derived from the voltage on thickness receiver coil 32b (FIG. 1a).

The phase circuitry includes a pair of comparators 170, 172 respectively connected to leads 102, 104, a phase measuring circuit 174, a phase memory 176, an ambiguity resolving circuit 178, and a compensating circuit 182.

The comparators 170 and 172 serve to transform the square waves appearing on leads 102 and 104 to proper logic levels for phase measuring circuit 174. The phase measuring circuit 174 detects the difference in phase between the square waves on leads 102 and 104, storing the phase difference detected in phase memory 176 as a function of the location of the thickness receiver coil 32b relative to the casing reference point. This signal is the uncorrected thickness signal. The phase memory 176 is similar in structure and operation to the memories 126, 166 and has an input lead 179 on which pulses from linkage 23 (FIG. 1a) are input indicating tool depth with respect to the casing. The phase memory 176 outputs the uncorrected thickness signal in coordination with the corrected permeability signal on lead 142 and the caliper signal on lead 128, such that all three signals correspond to the casing reference point. The uncorrected thickness signal is output on the lead 177 and on the lead 152 to the recorder 100.

Responsive to the uncorrected thickness signal on lead 177, ambiguity resolving circuit 178 is used to resolve any uncertainty which may occur in the phase shift of the flux detected by the thickness receiver coil 32b extending past 360 degrees. The signal on lead 202, the logarithm of the amplitude of the receiver voltage on coil 32b (FIG. 1b) is proportional to casing thickness and inherently has no ambiguity with respect to thickness associated with it. The signal lead 202 is correlated with the casing reference point by means of memorizer circuit 166 (with depth information from lead 168 via linkage 23) and is applied to ambiguity resolving circuit 178.

Ambiguity resolving circuit 178 senses the magnitude of the amplitude signal on lead 169 to determine whether or not a value representing 360 degrees should be added to the signal appearing on lead 177. Only if the magnitude of the amplitude signal on lead 169 is smaller than a threshold value corresponding to an amplitude attenuation which would result in a phase shift greater than 360 degrees, then a voltage equivalent to 360 degrees is added to the signal on lead 177.

Compensating circuit 182 uses the uncorrected thickness signal $\Delta\phi$ on lead 180, and the corrected permeability signal $\mu_c$ on lead 200 to generate a signal indicative of casing thickness according to the relationship, $$X = \frac{\Delta\phi}{2K\sqrt{\mu_c}} \quad (3)$$

where X=casing thickness and $K=2\sqrt{\pi f\sigma}$. Circuit 182 uses commercially available divider circuits and square root circuits to generate the thickness signal at its output on lead 184.

The display/recorder 100 is responsive to the caliper signal on the lead 128, to the corrected permeability signal on the lead 142, to the $\Delta\phi$ signal (the uncorrected thickness signal) on the lead 152, and to the corrected thickness signal on the lead 184 for direct display as a function well depth. Direct display of the corrected thickness signal on the lead 184 is a feature of this invention which eliminates the need for a base line log.

Figure 5:
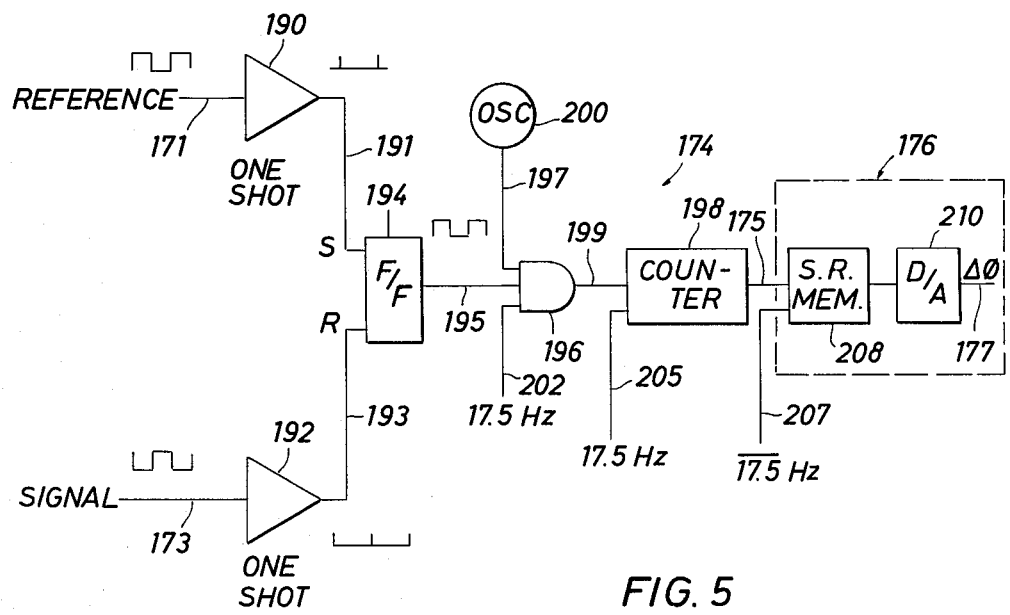
FIG. 5 is a schematic of a surface phase shift processing circuit.

Referring now to FIG. 5, a more detailed schematic of the phase measuring circuit 174 and of the phase memory 176 is shown. The phase measuring circuit 174 includes a pair of one shot multivibrators 190, 192, a R-S flip-flop 194, a gate 196, a counter 198, and an oscillator 200. The flip-flop 194 is connected to the multivibrators 190, 192 respectively by leads 191, 193. The gate 196 is connected to the flip-flop 194 by lead 195 and is connected to the oscillator 200 by lead 197. The counter 198 is connected to the gate 196 by lead 199.

In operation, the one shot multivibrators 190, 192 produce narrow pulses on the leads 191, 193 such that the time separation between occurrences of the pulses is indicative of the value of the flux phase shift which is to be determined. The flip-flop 194 is set by the pulses on lead 191 and is reset by the pulses on lead 193. Accordingly, the time during which the flip-flop 194 is in the set state is directly proportional to the phase shift between the signals on leads 171 and 173.

The gate 196 is coupled to the output of the flip-flop 194 and to the oscillator 200 for producing at its output lead 199 a series of pulses, the number of which is counted during the set state of flip-flop 194 and is a measure of the phase shift. The gate 196, an AND gate, is enabled for alternate time periods of a 35 Hz signal in response to a 17.5 Hz input signal on a lead 202. During the time that the gate 196 is enabled to pass the pulses from the oscillator 200, counter 198 is also enabled via the 17.5 Hz signal on a lead 205. At the end of the period during which the flip-flop 194 is in the set state, the counter is at a value indicative of the phase shift. For the next time period of the 35 Hz clock, the AND gate 196 is disabled and the counter 198 outputs its value to the phase shift memory 176.

The phase memory 176 includes a shift register memory 208 and a digital-to-analog converter 210. The digital-to-analog converter 210 produces the uncorrected thickness signal on the lead 177. During the period that the AND gate 196 is disabled and the counter 198 is outputting information to memory 208, the memory 208 is enabled by the 17.5 Hz signal on a lead 207. Accordingly, the values of the counter 198 are stored in the memory 208. At the end of the time period that the AND gate 196 is disabled and the counter 198 is being incremented, the counter is reset and enabled for counting once again. The digital contents of the memory 208 are converted by digital-to-analog converter 210 providing the uncorrected thickness signal on the lead 177.

By accounting for, and correcting for, changes in permeability in the casing under inspection, improved resolution and accuracy is achieved by means of the new and improved electromagnetic thickness tool described herein. Because changes in permeability are accounted for, a signal is produced which is directly indicative of the thickness of the casing under inspection, thereby eliminating the need to compare phase shift logs, which at best gives rather imprecise results in a cumbersome procedure.

Although the invention has been described in its preferred form with a certain degree of particularity, the present disclosure has been made only by way of example. Changes in the details and implementation of the preferred embodiment will be apparent without departing from the spirit and the scope of the invention. Even though the invention is described specifically for the thickness measurement of ferromagnetic casings in down hole oil well casings, the invention could find ready application for the thickness measurement of any iron pipe for which access to the inside is the only practical measurement. The invention described herein could find ready application for the measurement of oil and gas pipe lines for example.

What is claimed is:

1. In an electromagnetic thickness measuring tool having means for generating a thickness signal indicative of the thickness of a ferromagnetic casing, and means for generating a permeability signal indicative of the permeability of the casing the improvement comprisng:

means for generating a corrected permeability signal corrected for the variations of inside diameter of the casing and means for generating a corrected thickness signal corrected for the variations of permeability of the casing.

2. A method of electromagnetically measuring the thickness of a ferromagnetic casing using coaxial coils along the center of the casing, comprising the steps of:

(a) energizing a thickness transmitter coil with a low frequency thickness signal thereby creating a flux pattern passing outside the casing and returning through the casing to the thickness transmitter coil;

(b) measuring a receiver signal proportional to the time rate of change of said flux with a thickness receiver coil spaced along the axis from said coil;

(c) generating an uncorrected thickness signal, $\Delta\phi$, proportional to the phase difference between said receiver signal and said energizing signal;

(d) energizing a permeability transmitter coil with a permeability measuring signal at a frequency higher than said thickness signal, thereby creating a second flux pattern passing primarily through the casing and returning to the coil;

(e) measuring a permeability signal, $\mu$, proportional to the time rate of change of said second flux pattern in a permeability receiver coil spaced along the axis from said permeability transmitter coil;

(f) energizing a caliper transmitter coil at a high frequency, thereby creating a third flux pattern passing along the inside skin depth of the casing and returning to the caliper transmitter coil;

(g) measuring a caliper signal proportional to the time rate of change of said third flux pattern in a caliper receiver coil spaced along the axis from said caliper transmitter coil;

(h) using said caliper signal and said permeability signal, $\mu$, to generate a corrected permeability signal, $\mu_c$, corrected for the effects of variation of casing inside diameter on said permeability signal $\mu$; and (i) generating a corrected thickness signal proportional to $\Delta\phi/\sqrt{\mu_c}$.

3. An electromagnetic casing thickness tool for generating a thickness signal corrected for effects of varying casing permeability, the tool comprising:

(a) first means adapted to be positioned within the casing for generating an uncorrected thickness signal representative of the thickness of the casing uncorrected for the effects of the casing permeability;

(b) second means adapted to be positioned within the casing for generating a permeability signal representative of the permeability of the casing;

(c) said first means having a pair of thickness coils, including a transmitter thickness coil adapted to be energized at a first frequency for inducing eddy currents in said casing, and a receiver thickness coil adapted to be responsive to voltage induced by flux from said thickness coil and by said eddy currents;

(d) said second means having a pair of permeability coils, including a transmitter permeability coil adapted to be energized at a second frequency higher than said first frequency, the receiver permeability coil adapted to be responsive to the voltage induced by the flux generated by said transmitter permeability coil after traveling in the casing wall, said thickness coils being spaced along the axis of the casing, and said permeability coils being spaced along said axis at coaxial locations between said thickness coils; and (e) a signal processor responsive to the permeability signal and to the uncorrected thickness signal, including circuitry for applying a signal proportional to the inverse square root of said permeability signal to said uncorrected thickness signal, for generating a corrected thickness signal for recording, said signal processor further including means for detecting the relative locations of said set of thickness coils and said set of permeability coils and for generating an adjustment signal correlating said uncorrected thickness signal and said permeability signal to a common point on said casing.

4. A method of electromagnetically determining the thickness of ferromagnetic casing using sets of electrically energized coils spaced along an axis of the casing, comprising the steps of:

(a) generating an uncorrected thickness signal representative of the thickness of the casing at a given point, said uncorrected thickness signal being uncorrected for the effect of permeability of the casing;

(b) generating a caliper signal having a value representative of the inside diameter of the casing;

(c) generating an uncorrected permeability signal representative of the permeability of said casing uncorrected for the effect of the particular inside diameter of the casing;

(d) generating, in response to said caliper signal and to said uncorrected permeability signal, a corrected permeability signal representative of the permeability of said casing corrected for the effects of the inside diameter of the casing; and (e) generating, in response to said corrected permeability signal, and to said uncorrected thickness signal, a corrected casing thickness signal at said given point, said corrected casing thickness signal being corrected for the effects of the permeability of the casing thereon.

5. The method according to claim 4 wherein said step of generating a corrected thickness signal includes the steps of:

(a) generating a square root signal proportional to the square root of the value of said corrected permeability signal; and (b) generating a corrected thickness signal by dividing said uncorrected thickness signal by a signal proportional to the square root of said corrected permeability signal.

6. The method according to claim 4 wherein said step of generating the corrected permeability signal comprises the steps of:

(a) storing a table of values relating actual permeability of casing as a function of one inside diameter of the casing and the uncorrected permeability signal; and (b) selecting from said table of values a signal representing said corrected permeability signal corresponding to said measured uncorrected permeability signal.

7. The method according to claim 6 wherein said step of selecting from said table comprises:

(a) adjusting said uncorrected permeability signal in response to changes in measured inside diameter signal from said one inside diameter of said table of values; and (b) addressing said table of values with the adjusted permeability signal to generate a permeability signal corrected for changes in inside diameter from that stored in said table of values.

8. An electromagnetic casing thickness tool for generating a thickness signal corrected for effects of varying casing permeability, the tool comprising:

(a) first means adapted to be positioned within the casing for generating an uncorrected thickness signal representative of the thickness of the casing uncorrected for the effects of the casing permeability;

(b) second means adapted to be positioned within the casing for generating a permeability signal representative of the permeability of the casing;

(c) third means for generating a caliper signal representative of the inside diameter of the casing;

(d) permeability correcting means responsive to said caliper signal and to said permeability signal for generating a corrected permeability signal corrected for the effects of the inside diameter of said casing; and (e) a signal processor responsive to the corrected permeability signal and to the uncorrected thickness signal, including circuitry for applying a signal proportional to the inverse square root of said permeability signal to said uncorrected thickness signal, for generating a corrected thickness signal for recording.

9. The tool according to claim 8 wherein said permeability correcting means comprises a memory having data stored therein relating said permeability signals to said corrected permeability signals as a function of at least one specified casing inside diameter.

10. The tool according to claim 9 wherein said data stored in said memory relates the permeability of a casing corrected for a single predetermined inside diameter value to permeability signals uncorrected for casing inside diameter and further comprises means for biasing said uncorrected permeability signal to a value effectively corresponding to said predetermined inside diameter value.

11. The tool according to claim 8 wherein said first means comprises a pair of thickness coils, including a first transmitting coil adapted to be energized at a first frequency, and wherein said second means comprises a pair of permeability coils, including a second transmitting coil adapted to be energized at a second frequency higher than said first frequency, said set of thickness coils being spaced along the axis of the casing, and said permeability coils being spaced along said axis at coaxial locations between said thickness coils, and wherein said third means comprises a pair of caliper coils disposed along said axis at spaced locations coaxial with said thickness coils.

12. The tool according to claim 11 further comprising a ferrite core connecting said caliper coils.

13. The tool according to claim 11 further including: a first energizing circuit for energizing said first transmitting coil with a signal at said first frequency, whereby said uncorrected thickness signal is generated proportional to the phase difference between said first frequency energizing signal and said signal received from the other of said pair of thickness coils; and a second energizing circuit for energizing said second transmitting coil with a second signal at said second frequency.

14. The tool according to claim 13 wherein the first frequency applied to said thickness coils is approximately 35 Hz and wherein the second frequency applied to said permeability coils is an integral multiple of said first frequency.

15. The tool according to claim 14 wherein the second frequency is approximately 210 Hz.

16. A thickness tool for determining the thickness of a ferromagnetic casing, comprising:
(a) thickness coil means, adapted to be positioned within the casing and energized by a first signal, for generating an uncorrected thickness signal having a phase shifted from that of the first signal by an amount representative in part of the thickness of the casing, said uncorrected thickness signal being uncorrected for the effects of the permeability of the casing;
(b) permeability coil means, adapted to be positioned within the casing, for generating an uncorrected permeability signal representative in part of the permeability of said casing, said uncorrected thickness signal being uncorrected for the effects of the inside diameter of the casing;
(c) caliper coil means, adapted to be positioned within the casing, for generating a caliper signal representative of the inside diameter of the casing, said thickness coil means, said permeability coil means and said caliper coil means being disposed coaxially along the axis of said casing and positioned therealong such that said thickness coil means are disposed at first spaced locations, said permeability coil means being positioned at second spaced locations within said first spaced locations, and said caliper coil means being positioned at third spaced locations adjacent said first spaced locations;
(d) means for generating a corrected permeability signal in response to said uncorrected permeability signal and to the caliper signal, said corrected permeability signal being corrected for the effect of the inside diameter of the casing on the value of permeability as measured by said permeability coils; and
(e) a signal processor responsive to the corrected permeability signal and to the uncorrected thickness signal for generating a corrected thickness signal having a value corrected for the effects of permeability of said casing.

17. The electromagnetic thickness tool according to claim 16 and including position indicating means for generating a position signal representative of the position of the caliper coils relative to a reference point on the casing, and wherein said signal processor comprises means responsive to the position signals for generating an adjusted caliper signal indicative of the inside diameter of the casing at the reference point.

18. The tool according to claim 17 wherein said corrected permeability signal generating means comprises a programmed memory which is responsive to the uncorrected permeability signal and to the adjusted caliper signal for generating the corrected permeability signal.

19. The tool according to claim 18 and comprising means responsive to said uncorrected thickness signal for correlating the value thereof to a value corresponding to said reference point.

20. The electromagnetic thickness tool according to claim 16 and including a ferrite core connecting said caliper coils.

21. The electromagnetic thickness tool according to claim 16 wherein said signal processor comprises means for generating a signal proportional to the square root of the corrected permeability signal, and means for generating a signal proportional to said uncorrected thickness signal divided by said square root signal.

22. The tool according to claim 8 or 16 further including an energizing circuit having a timing circuit, an automatic gain control circuit, and an amplifier circuit, for energizing said thickness coils.

* * * * *